UNITED STATES PATENT OFFICE.

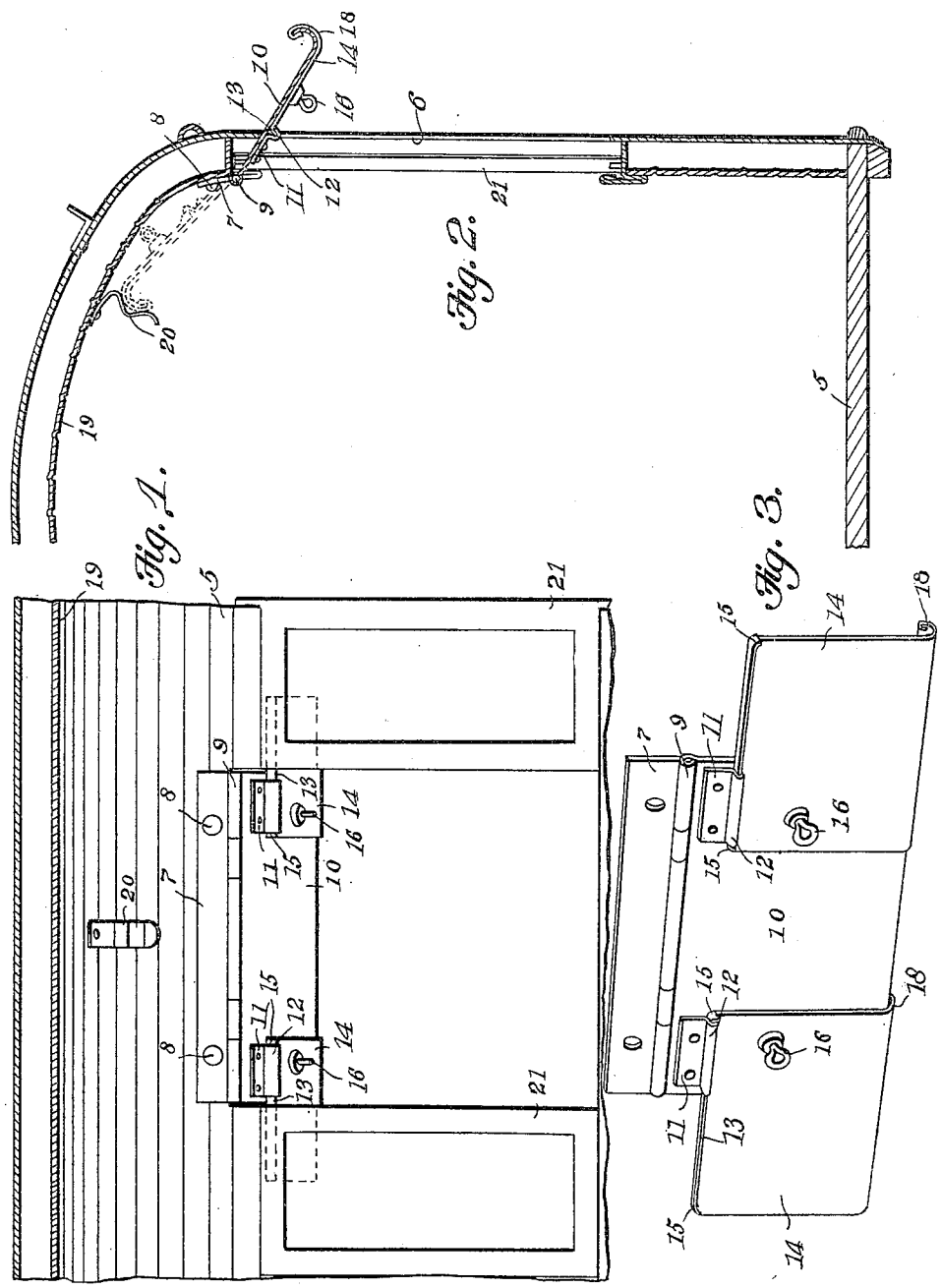

EDWIN W. PAYNE, OF CREWE, VIRGINIA.

HOOD OR SHIELD FOR LOCOMOTIVE-CAB WINDOWS.

No. 824,261.   Specification of Letters Patent.   Patented June 26, 1906.

Application filed October 16, 1905. Serial No. 283,020.

*To all whom it may concern:*

Be it known that I, EDWIN W. PAYNE, a citizen of the United States, residing at Crewe, in the county of Nottoway and State of Virginia, have invented a new and useful Hood or Shield for Locomotive-Cab Windows, of which the following is a specification.

This invention relates to an improved hood or shield for locomotive-cab windows, and has for its object to provide a simple, inexpensive, and efficient device of this character which will effectually protect the engineer from the rays of the sun when making long runs in summer and which will also serve to deflect rain, snow, and sleet and prevent the same from obscuring the vision of the engineer.

A further object of the invention is to provide a shield or awning capable of being compactly folded within the cab when not in use, so as not to interfere with the opening or closing of the window.

A further object is to form the shield with a pair of oppositely-disposed sliding wings or extensions adapted to engage the exterior walls of the cab, and thereby support the shield or hood at the proper angle or inclination.

A still further object is to provide the hood and its extensions or wings with terminal flanges which form a trough and serve to conduct the water or condensed steam from the roof of the cab to each side of the windows, so as to prevent the same from dripping on the engineer.

With these and other objects in view the invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principles or sacrificing any of the advantages of the invention.

In the accompanying drawings, forming a part of this application, Figure 1 is a longitudinal view of a portion of a locomotive-cab looking at the interior of the cab and showing my improved hood or shield in operative position above the cab-window. Fig. 2 is a transverse sectional view taken on the line 2 2 of Fig. 1, and Fig. 3 is a perspective view of the hood or shield detached.

Similar numerals of reference indicate corresponding parts in all of the figures of the drawings.

The numeral 5 designates the cab of a locomotive-engine of any suitable shape and construction, the cab shown by way of illustration in the present case being formed of sheet-iron and provided with the usual side window-opening 6, over which is placed my improved hood or shield.

The hood or protector consists of a supporting-plate 7, riveted or otherwise rigidly secured to the top of the car inside the latter and immediately above the window, as indicated at 8, and to which is hinged, as shown at 9, a movable section or shield 10, the free end of which is adapted to be swung outwardly through the window-opening and beyond the general plane of the side of the car, as best shown in Fig. 2 of the drawings, so as to form a shield or hood to protect the engineer from the rays of the sun. Secured to the opposite ends of the movable section 10 are brackets 11, provided with alined flanges which form guides 12 for the reception of the longitudinal ribs 13 of locking wings or extensions 14, mounted for sliding movement on the section 10 and adapted to engage the exterior side walls of the car and support the shield in an inclined position, as shown. The opposite ends of the guide-ribs 13 are bent downwardly at 15 to form stops which serve to limit the sliding movement of the locking wings or members 14, the latter being provided with suitable knobs or finger-pieces 16 for convenience in moving said wings to operative and inoperative positions. The free end of the movable section or shield 10 is formed with an upwardly-extending curved flange 17, while the wings 14 are formed with similar flanges 18, which slidably engage the flange 17 and have their terminal portions bent over the end of the flange 17, so as to retain the sliding wings in position on the movable section. The flanges 17 and 18 form, in effect, a trough and serve to conduct the condensed steam or moisture, which usually drips from the roof of the cab when the latter is constructed of sheet-iron, to a point beyond the vertical sills of the windows, thereby preventing the same from dripping on the engineer when making his usual observations. Attention is here called to the fact that the ribs 13 not only serve to guide the sliding wings 14, but also serve as an additional bearing-surface for engagement with the side of the car.

As a means for supporting the hood or shield in inoperative position there is secured to the ceiling 19 of the cab a spring-clip 20, which engages the curved flange of the movable section 10 when the latter is swung inwardly to the position indicated by dotted lines in Fig. 2 and in which position the windows 21 may be either closed or opened.

In operation when it is desired to use the hood or shield the latter is released from the clip 20 and swung outwardly on the hinge 9 to the inclined position shown in Fig. 2, after which the wings or extensions are moved laterally to the positions shown by dotted lines in Fig. 1. It will thus be observed that upward movement of the section 10 is prevented by engagement with the top of the window opening or frame 6, while the wings 14 by engagement with the sides of the cab prevent downward movement of said section. To move the shield to inoperative position, it is simply necessary to withdraw the wings and swing the movable section inwardly and upwardly until the curved flange engages the spring-clip.

While the device is shown and described on a locomotive-cab, it is obvious that the same may be used with equally good results in connection with doors and windows of private dwellings, office buildings, railway-cars, or wherever a shield of this character would be desirable.

From the foregoing description it will be seen that there is provided an extremely simple and inexpensive device admirably adapted for the attainments of the ends in view.

Having thus described the invention, what is claimed is—

1. The combination with a support having an opening formed therein, of a shield secured to one side of the support and movable through the opening to operative position on the opposite side thereof, and means for locking the shield in operative position.

2. The combination with a support having an opening formed therein, of a shield secured to one side of the support and movable through the opening to operative position on the opposite side thereof, and locking members carried by the shield and adapted to engage the adjacent walls of the support.

3. The combination with a support having an opening formed therein, of a shield pivoted to one side of the support and having its free end movable through the opening to operative position on the opposite side of the support, and locking members slidably mounted on the shield and adapted to engage the adjacent walls of the support.

4. The combination with a support having an opening formed therein, of a shield pivoted to one side of the support and having its free end movable through the opening to operative position on the opposite side of the support, means slidably mounted on the shield and adapted to engage the support for locking the shield in operative position, and means for locking said shield in inoperative position.

5. The combination with a support having an opening formed therein, of a shield secured to one side of the support and having its free end movable through the opening to operative position on the opposite side of the support and provided with a terminal flange, and locking members provided with corresponding flanges slidably mounted on the shield and adapted to engage the adjacent walls of the support.

6. The combination with a support having an opening formed therein, of a shield pivoted to one side of the support and having its free end movable through the opening to operative position on the opposite side of the support, guide-flanges carried by the shield, and locking members provided with longitudinal ribs for slidable engagement with the guide-flanges, said ribs being adapted to engage the adjacent walls of the support for locking the shield in operative position.

7. The combination with a support having an opening formed therein, of a shield pivoted to one side of the support and having its free end movable through the opening to operative position on the opposite side of the support and provided with a terminal upwardly-extending flange, locking-plates slidably mounted on the shield and provided with corresponding flanges adapted to embrace and engage the flange on the shield, and finger-pieces carried by the locking-plates for moving said plates laterally into engagement with the adjacent walls of the support.

8. The combination with an engine-cab having a window, of a shield pivoted to the interior walls of the cab above the window and having its free end movable through said window to operable position outside the cab, locking members slidably mounted on the shield and adapted to engage the exterior walls of the cab for locking the shield in operative position, and means for supporting said shield in elevated position within the cab.

In testimony that I claim the foregoing as my own I have hereto affixed my signature in the presence of two witnesses.

EDWIN W. PAYNE.

Witnesses:
A. BETHEL, Jr.,
O. B. AKERS.